United States Patent
Anthofer et al.

(10) Patent No.: US 12,538,874 B2
(45) Date of Patent: Feb. 3, 2026

(54) SECTIONAL PLANTER

(71) Applicants: Kaitlin Anthofer, Exira, IA (US); Travis Anthofer, Exira, IA (US)

(72) Inventors: Kaitlin Anthofer, Exira, IA (US); Travis Anthofer, Exira, IA (US)

(*) Notice: Subject to any disclaimer, the term of this patent is extended or adjusted under 35 U.S.C. 154(b) by 0 days.

(21) Appl. No.: 18/437,179

(22) Filed: Feb. 8, 2024

(65) Prior Publication Data
US 2024/0268280 A1 Aug. 15, 2024

Related U.S. Application Data

(60) Provisional application No. 63/484,822, filed on Feb. 14, 2023.

(51) Int. Cl.
*A01G 9/02* (2018.01)

(52) U.S. Cl.
CPC .................................. *A01G 9/0302* (2025.01)

(58) Field of Classification Search
CPC ........ A01G 9/02; A01G 9/028; A01G 9/0302; A01G 9/00
USPC .................................................. 220/628, 630
See application file for complete search history.

(56) References Cited

U.S. PATENT DOCUMENTS

| | | |
|---|---|---|
| 437,565 A | 9/1890 | Byrne |
| 576,850 A | 2/1897 | Iken |
| 579,295 A | 3/1897 | Delzell |
| 584,433 A | 6/1897 | Walker |
| 610,156 A | 8/1898 | Mechwart et al. |
| 726,766 A | 4/1903 | Schaefer |
| 1,499,473 A | 7/1924 | David |
| 1,776,375 A | 9/1930 | Russell |
| 2,594,307 A | 4/1952 | Valenzuela |
| 2,960,799 A | 11/1960 | Schneider |
| 3,047,183 A * | 7/1962 | Papa ............... F16B 5/0614 D11/155 |
| 3,065,570 A | 11/1962 | Fukuhara |
| 3,747,268 A | 7/1973 | Linder |
| 4,216,622 A | 8/1980 | Hackney et al. |
| D278,521 S | 4/1985 | Baird et al. |
| 4,708,256 A | 11/1987 | Intardonato |
| 4,847,741 A | 7/1989 | Boettinger |
| 5,294,012 A | 3/1994 | Shott et al. |
| D383,417 S | 9/1997 | Davis |
| D386,114 S | 11/1997 | Carson |
| 5,953,858 A * | 9/1999 | Loosen ............ A01G 9/026 47/66.2 |
| 5,960,587 A | 10/1999 | Brasseur, Jr. et al. |

(Continued)

FOREIGN PATENT DOCUMENTS

DE 202013009795 U1 * 1/2014 ............ A01G 9/28

*Primary Examiner* — Magdalena Topolski
*Assistant Examiner* — Spencer T Callaway
(74) *Attorney, Agent, or Firm* — Vander Velden Law Firm, LLC; Melinda S. Vander Velden

(57) ABSTRACT

A sectional planter configurable for placement around a post or other generally vertical structure. The sectional planter comprises a base having a first base section and a second base section that form the upstanding walls of the sectional planter. One or more cross supports span an interior volume of the base and provide support for one or more inserts that may be placed into the base. The inserts may serve as a planter or similar container for objects. The inserts may also be inverted to serve as a flat surface for use as a table or bench.

10 Claims, 11 Drawing Sheets

(56) References Cited

U.S. PATENT DOCUMENTS

| | | | |
|---|---|---|---|
| 6,161,333 A | 12/2000 | Poston | |
| D445,358 S | 7/2001 | Simmons | |
| 6,381,902 B1 | 5/2002 | Batshon | |
| 6,789,916 B2 | 9/2004 | Ruggles | |
| 6,964,129 B2 | 11/2005 | Fenwick | |
| 7,155,860 B1 | 1/2007 | Ferguson, III | |
| 7,428,798 B2 | 9/2008 | Abney, II et al. | |
| D641,653 S | 7/2011 | Gregson et al. | |
| 9,668,428 B1 | 6/2017 | Frame | |
| 10,356,985 B1 | 7/2019 | Raymond | |
| 10,501,232 B1 | 12/2019 | Price | |
| 10,602,685 B2 | 3/2020 | Eckert | |
| 10,653,075 B1 * | 5/2020 | Joseph | A01G 9/028 |
| 11,240,972 B2 | 2/2022 | Lee et al. | |
| 11,464,174 B1 | 10/2022 | Suteerawanit | |
| 2006/0156625 A1 | 7/2006 | Abney, II et al. | |
| 2007/0227068 A1 | 10/2007 | Cataldi | |
| 2008/0141587 A1 | 6/2008 | Guthrie | |
| 2010/0107488 A1 | 5/2010 | King et al. | |
| 2013/0042528 A1 * | 2/2013 | Nason | A01G 13/31 47/85 |
| 2013/0263505 A1 * | 10/2013 | Iesals | A47G 7/044 47/65.7 |
| 2021/0315166 A1 | 10/2021 | Wilson | |
| 2022/0369571 A1 | 11/2022 | Pointek | |

\* cited by examiner

SECTIONAL PLANTER

CROSS REFERENCE TO RELATED APPLICATIONS

This application claims priority to U.S. Provisional Patent Application No. 63/484,822, filed on Feb. 14, 2023, the entirety of which is hereby incorporated herein by reference.

FIELD OF THE INVENTION

The disclosure relates generally to a sectional planter. In particular, in one embodiment, the disclosure provides for a sectional planter mountable around a post, tree, or other generally vertical object In other embodiments, the sectional planter may be configured for use as a table mountable around a post, tree, or other generally vertical object. In the various embodiments, the sectional planter may provide a space for storage.

BACKGROUND OF THE INVENTION

At times it is desirable to place a planter around a vertical structure such as a lamp post, umbrella stand, mailbox post, tree, or similar generally vertical object. In the past, sectional planters have been formed from two separate containers that, when placed together around the vertical object, surround the vertical object. Such sectional planters are typically filled from top to bottom with soil; thus a large amount of soil must be purchased to fill such planters, and their weight makes them difficult to move after filling. Such sectional planters have generally been manufactured to fit around one particular vertical object or around a very limited size or shape of vertical objects. These issues become particularly problematic when a planter is needed for temporary use, such as when it is used for an event and then moved to another location for another purpose. Therefore, an improved sectional planter that requires less soil and is easily movable and reconfigurable for other purposes is desired.

SUMMARY OF THE INVENTION

In accordance with various embodiments of the invention, a sectional planter mountable around a pole or similar generally vertical object is provided. In one embodiment, a sectional planter comprises a base having two sections that are placed around the vertical object and connected together. Insertable containers containing plants or other items may be inserted into and supported by the base. In another embodiment, the insertable containers may be inverted before being inserted into and supported by the base, allowing the sectional planter to be used as a table or bench. The volume inside the base that is not occupied by the insertable containers may be used as storage space.

DETAILED DESCRIPTION OF THE INVENTION

Figure 1:
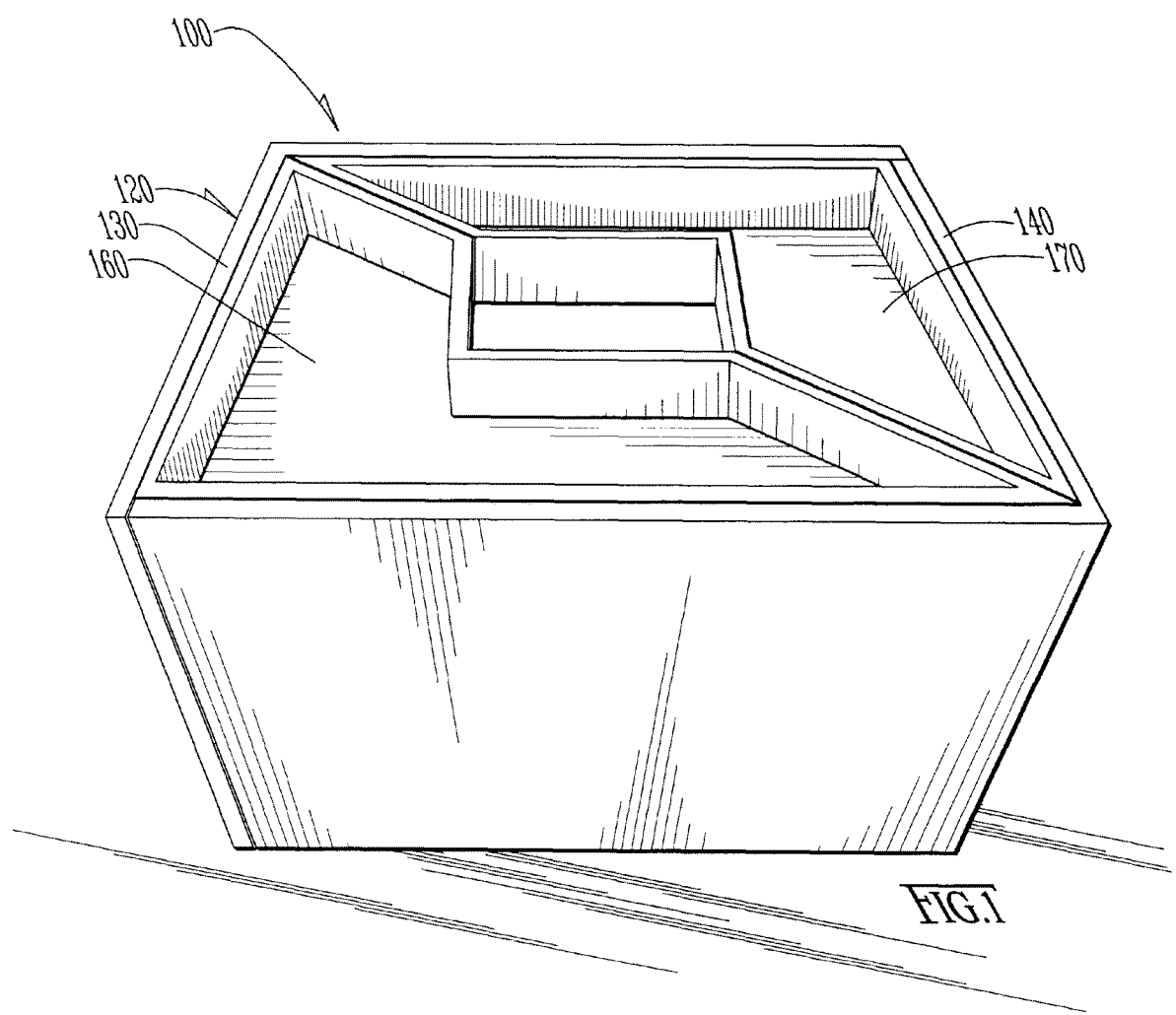
FIG. 1 illustrates a sectional planter in accordance with one embodiment of the invention.
Figure 2:
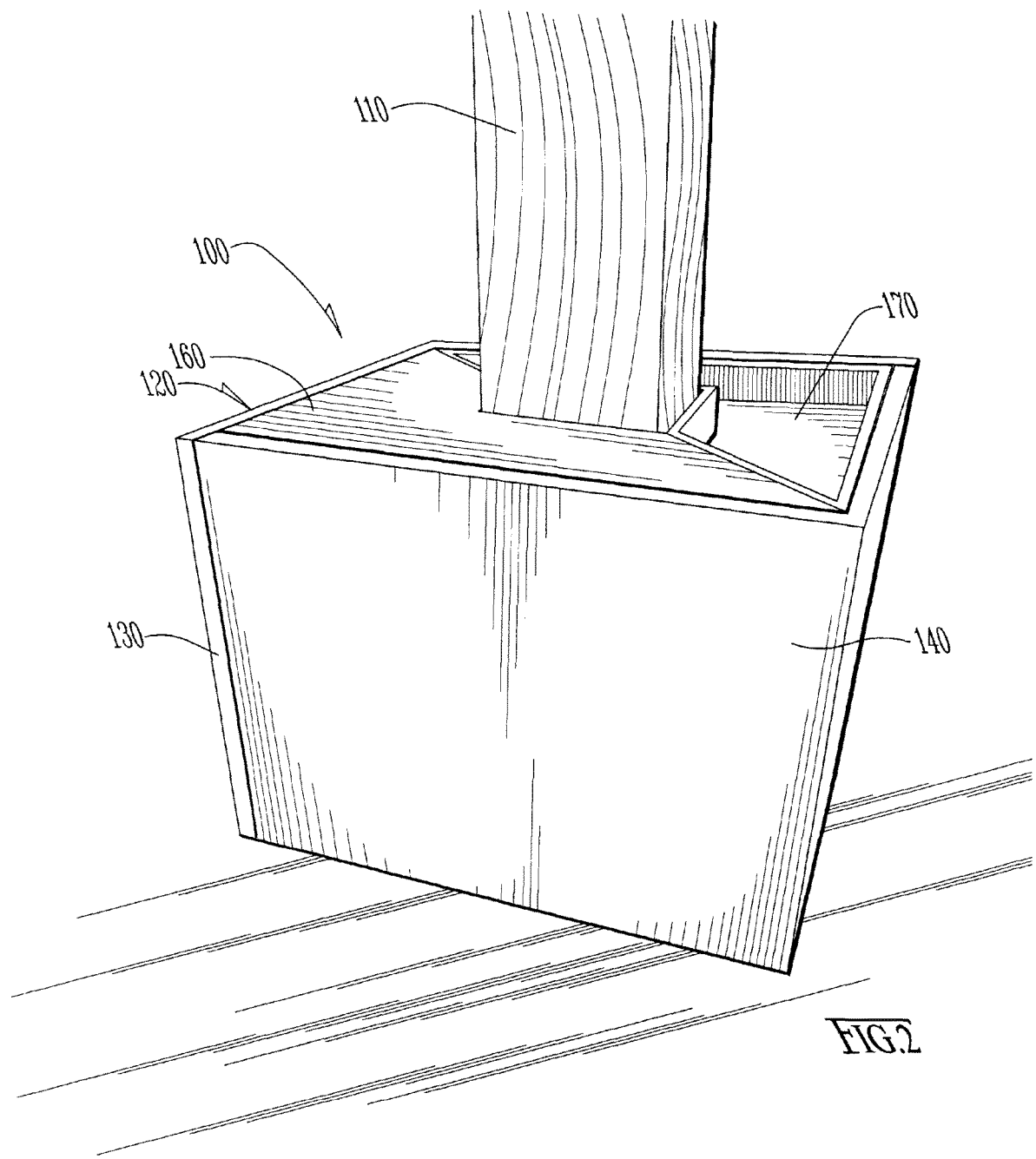
FIG. 2 illustrates a sectional planter in accordance with one embodiment of the invention.

Some embodiments of the present invention will now be described more fully hereinafter with reference to the accompanying drawings, in which some, but not all, embodiments of the invention are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the apparatus or method steps are not shown in one or more of the figures for clarity and to facilitate explanation of embodiments of the present invention.

In accordance with one embodiment, FIGS. 1-10 illustrate a sectional planter box 100. Sectional planter box 100 may alternatively be referred to as sectional planter 100 or planter box 100 without departing from the scope of the disclosure. Sectional planter 100 is configured to be installed around a generally vertical structure 110. The generally vertical structure 110 may be a post, column, tree, light post, mailbox, utility pole, umbrella stand, pillar, deck or porch support post, flag pole, or any other similar generally vertical structure. Sectional planter 100 may have any height, width, depth, and shape without departing from the scope of the disclosure.

Figure 3:
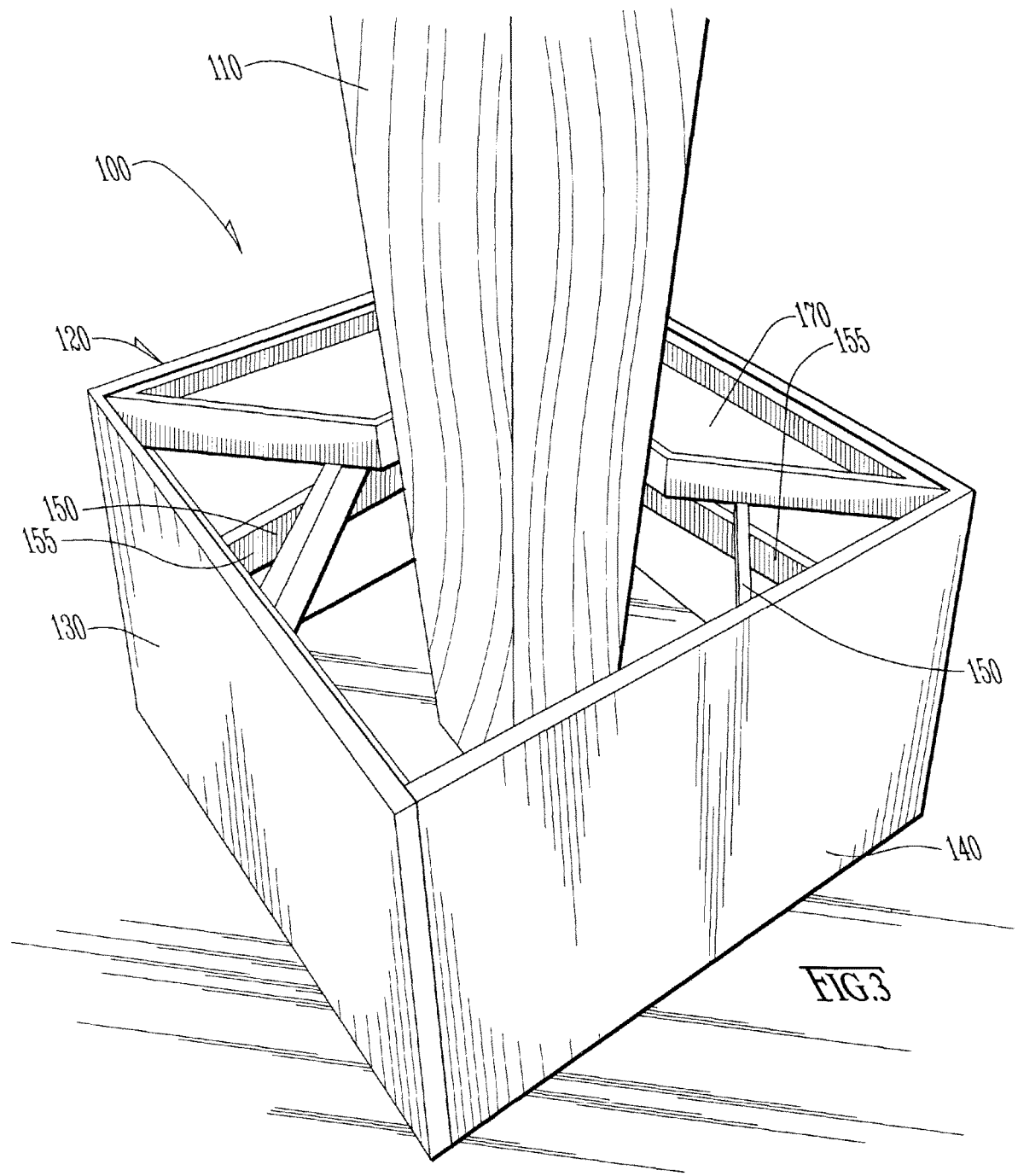
FIG. 3 illustrates a sectional planter in accordance with one embodiment of the invention.
Figure 4:
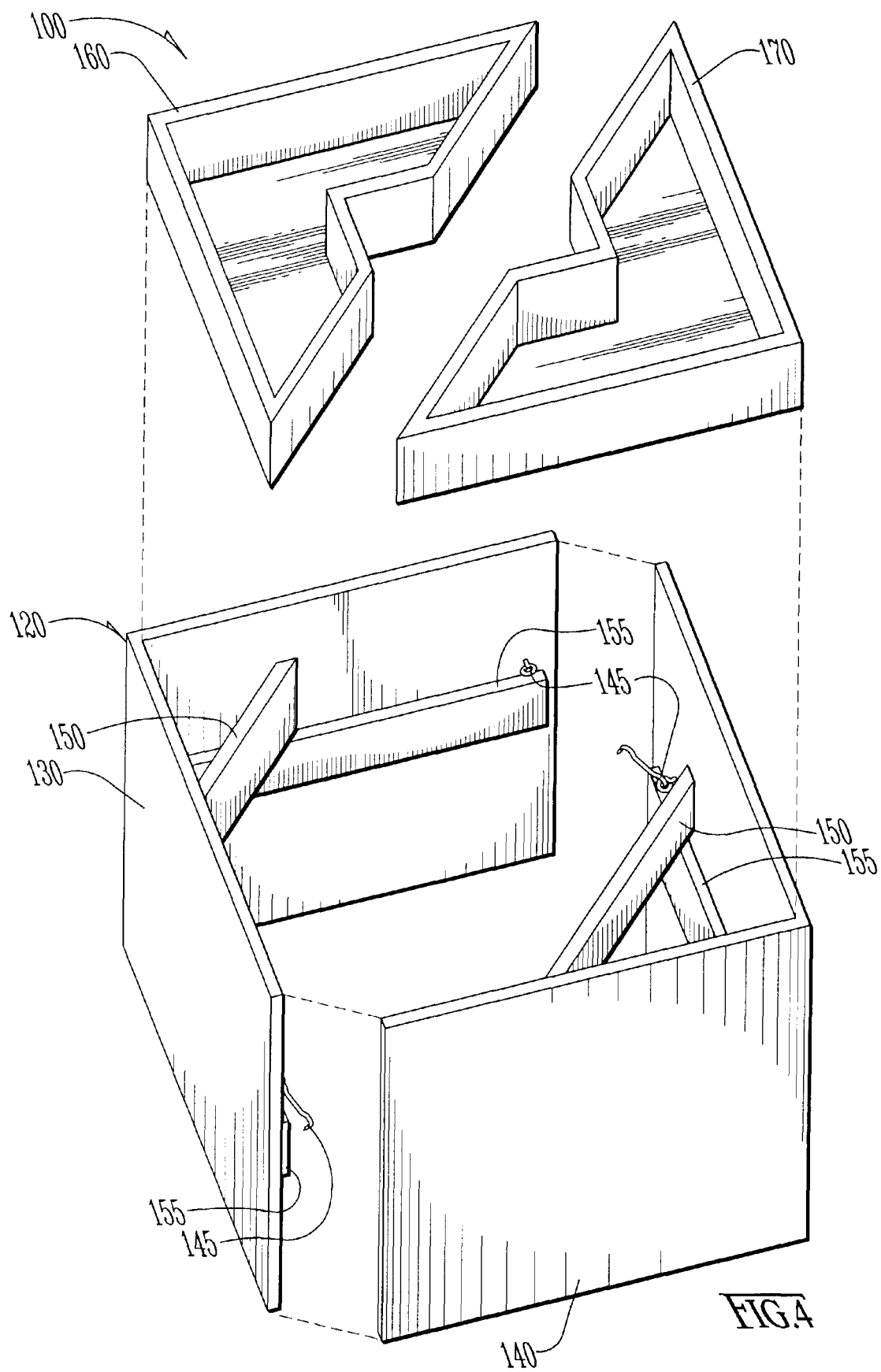
FIG. 4 illustrates a sectional planter in accordance with one embodiment of the invention.
Figure 5:
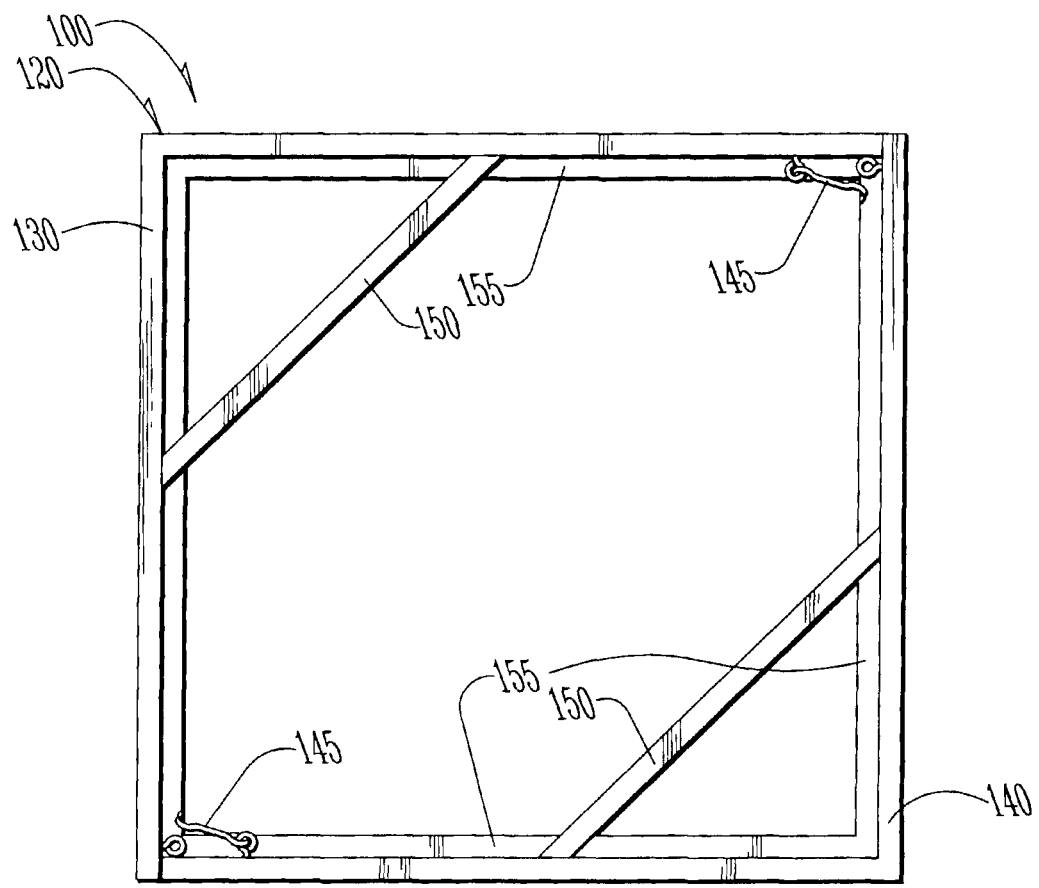
FIG. 5 illustrates a base of a sectional planter in accordance with one embodiment of the invention.
Figure 6:
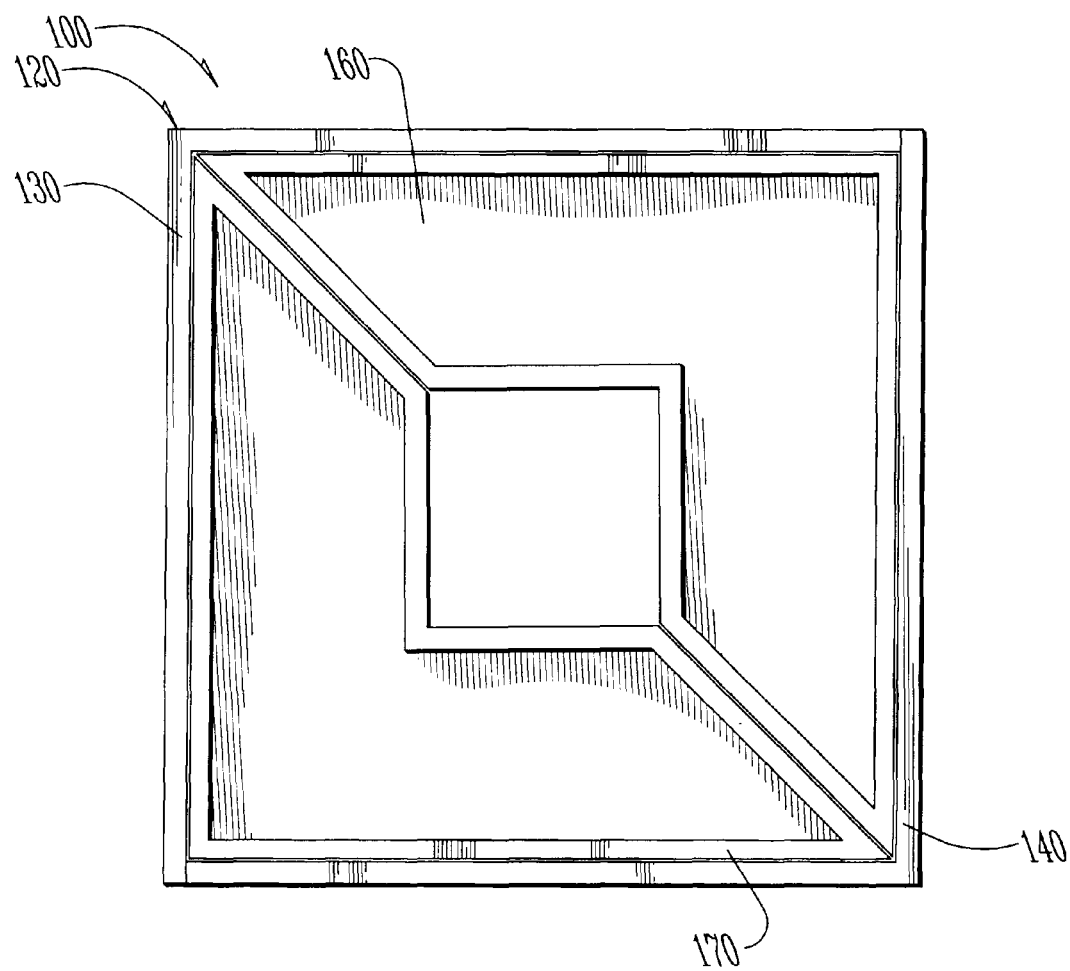
FIG. 6 illustrates a top view of a sectional planter in accordance with one embodiment of the invention.
Figure 7:
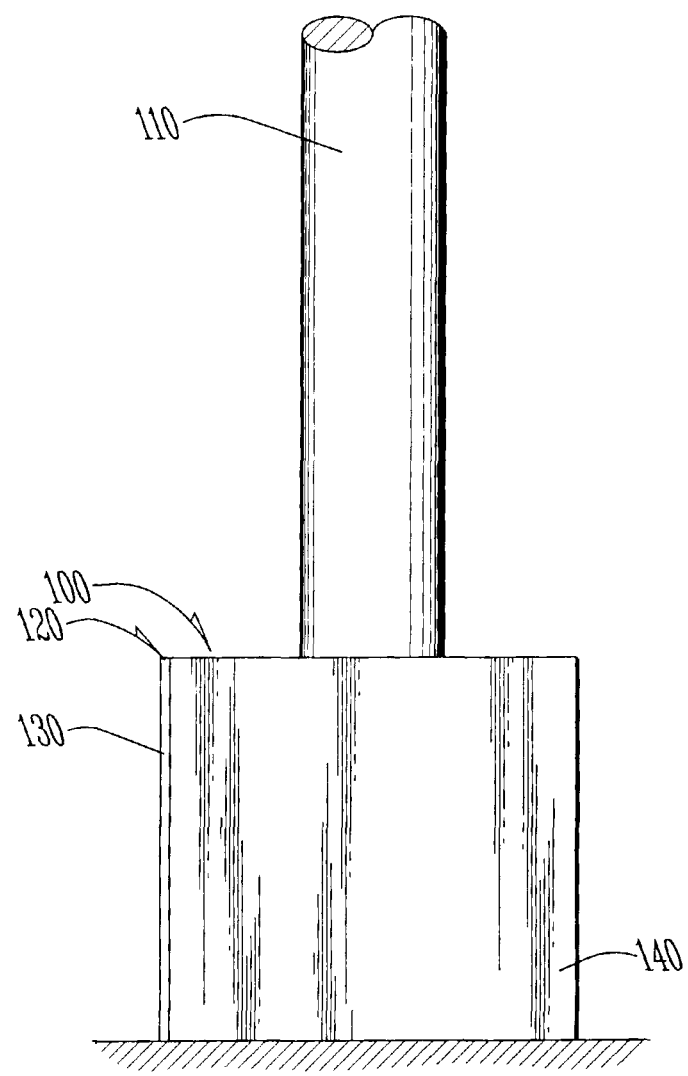
FIG. 7 illustrates a sectional planter installed around a vertical structure in accordance with one embodiment of the invention.
Figure 8:
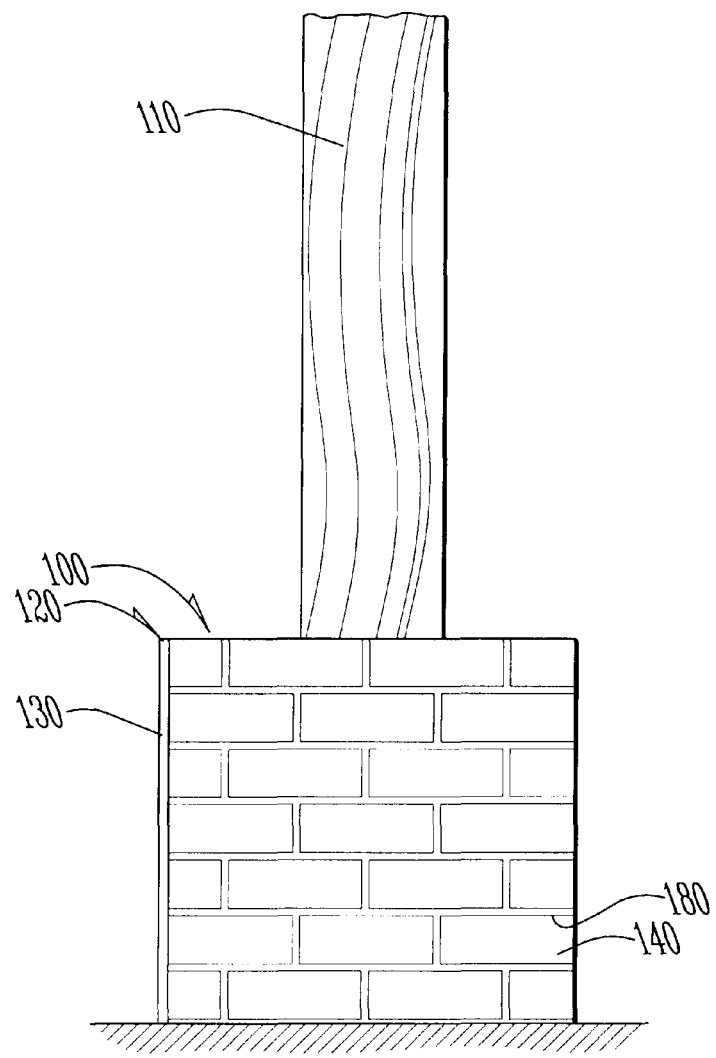
FIG. 8 illustrates a sectional planter installed around a vertical structure in accordance with one embodiment of the invention.
Figure 9:
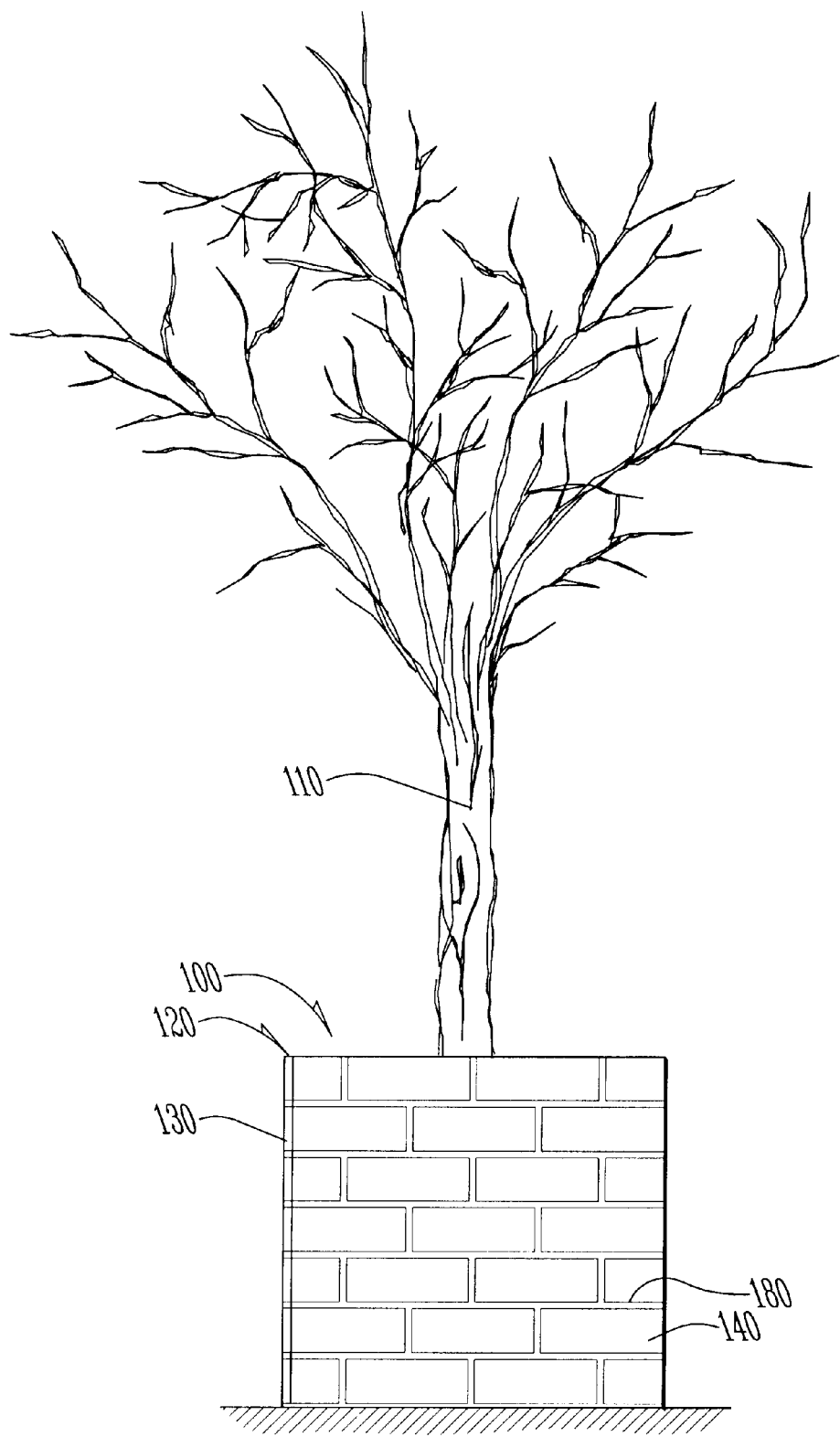
FIG. 9 illustrates a sectional planter installed around a tree in accordance with one embodiment of the invention.
Figure 10:
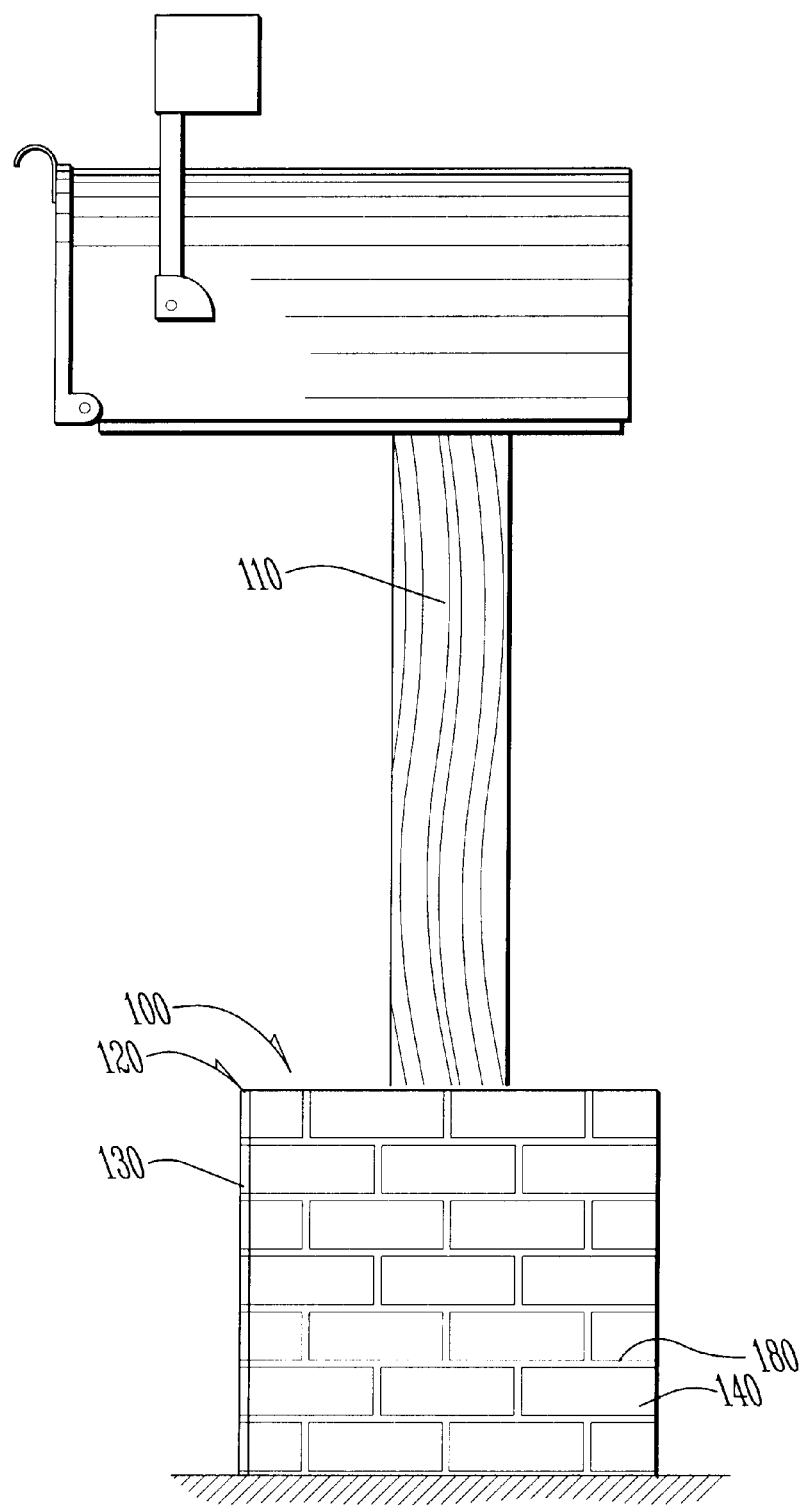
FIG. 10 illustrates a sectional planter installed around a mailbox post in accordance with one embodiment of the invention.

As shown in FIGS. 1-6, sectional planter 100 comprises a base 120. In one embodiment, base 120 is formed a first base section 130 and a second base section 140. First base section 130 may be formed from two generally rectangular planar surfaces where the adjacent vertical edges of the two generally rectangular planar surfaces are connected together, the other vertical edge of each generally rectangular planar surface is open or unconnected, and the two planar surfaces of the first base section 130 are generally perpendicular to each other. Similarly, the second base section 140 may be formed from two generally rectangular planar surfaces where adjacent vertical edges of the two generally rectangular planar surfaces are connected together, the other vertical edge of each generally rectangular planar surface is open or unconnected, and the two planar surfaces of the second base section 140 are generally perpendicular to each other. First base section 130 and second base section 140 may be placed around a generally vertical structure 110 such that the open vertical edges of the first base section 130 contact the adjacent vertical edges of the second base section 140 such that the base 120 surrounds the generally vertical structure 110 and the generally rectangular planar surfaces of the first base section 130 and the second base section 140 form the upstanding walls of base 120. As shown in FIGS. 4 and 5, first base section 130 and second base section 140 may connect to each other using one or more fasteners 145. Fasteners 145 may be hooks and eyes, magnets, or any other connector suitable for holding first base section 130 and second base section 140 securely together. While base 120 is shown and described as having a square or rectangular cross section when viewed from above, base 120 may alternatively have a round, triangular, or other shaped cross section without departing from the scope of the disclosure. Base 120 may be constructed from wood, steel, plastic, or any other suitable material.

As shown in FIGS. 3 and 4, a cross support 150 spans the interior volume of the first base section 130, connecting the two generally rectangular planar surfaces of the first base section 130. Similarly, another cross support 150 spans the interior volume of the second base section 140, connecting the two generally rectangular planar surfaces of the second base section 140. Cross supports 150 provide strength and stability for the first base section 130, second base section 140, and base 120 as a whole. Together with flat side supports 155, cross supports 150 also support first insert 160 and second insert 170, preventing the inserts 160, 170 from falling into the open area at the bottom of the base 120. Cross supports 150 may be constructed from wood, steel, plastic, or any other suitable material.

As shown in FIG. 4, a flat side support 155 may attach to each of the generally rectangular planar surfaces of the first base section 130 and the second base section 140. The flat side supports 155 may be installed at any depth of the base 120, and are connected such that each flat side support 155 is generally horizontal. Together with cross supports 150, flat side supports 155 provide support to first insert 160 or second insert 170, preventing the inserts 160, 170 from falling into the open area at the bottom of the base 120. Flat side supports 155 may be constructed from wood, steel, plastic, or any other suitable material.

As shown in FIGS. 1-4, a first insert 160 and a second insert 170 are placed within base 120 such that first insert 160 and second insert 170 rest upon cross supports 150. First and second inserts 160, 170 are formed to be removably inserted into the base 120. In one embodiment, the first insert 160 fills the volume formed above the cross support 150 installed on the first base section 130 and between the generally rectangular planar surfaces of the first base section 130 and the generally vertical structure 110. Similarly, the second insert 170 fills the volume formed above the cross support 150 installed on the second base section 140 and between the generally rectangular planar surfaces of the second base section 140 and the generally vertical structure 110. Sides of first insert 160 and second insert 170 are generally in contact with the sides of the base 120. A notch in the side of the first insert 160 adjacent to the generally vertical structure 110 and a similar notch in the side of the second insert 170 adjacent to the generally vertical structure 110 allow for the generally vertical structure 110 to pass through the sectional planter 100. Connected side walls of the first insert 160 extend around the perimeter of the first insert 160 and engage a bottom of the first insert 160, and similarly connected side walls of the second insert 170 extend around the perimeter of the second insert 170 and engage a bottom of the second insert 170. The connected sidewalls and bottom of the first insert 160 form a container. Similarly, the connected sidewalls and bottom of the second insert 170 form a second container. In one embodiment, first and second inserts 160, 170 may be used as planting containers suitable for holding living plants and soil; however, other items such as food items, eating utensils, or any other item that is desired to be displayed or dispensed from the sectional planter 100 may be placed in the first or second inserts 160, 170. Alternatively, first insert 160, second insert 170, or both may be inverted such that the bottom is positioned upward, allowing the sectional planter 100 to function as a table or a bench. For example, in FIG. 2, first insert 160 is shown in the inverted position. When configured for use as a table, inserts 160 and 170 are extended such that the inserts 160 and 170 extend over the top edges of the base 120 rather than being placed inside the base 120 and resting on cross supports 150 and flat side supports 155. When configured for use as a table, inserts 160 and 170 may hook together with a fastener similar to the fastener 145 that holds the first base section 130 and the second base section 140 together. First insert 160 and second insert 170 may be constructed from wood, metal, plastic, or any other suitable material.

The sectional planter 100 described has many advantages, including that the first insert 160 and second insert 170 may be easily removed from the base 120 and the entire sectional planter 100 moved with minimal effort. One or both of the first and second inserts 160, 170 may be reconfigured such that sectional planter 100 serves as a planter, table, or both. In addition, the volume formed below the cross supports 150 and between the upstanding walls of the base 120 may be used for storage. The first base section 130 and second base section 140 may also be separated and either the first base section 130, second base section 140, or both positioned at the corner of a building or other similar structure.

Figure 11:
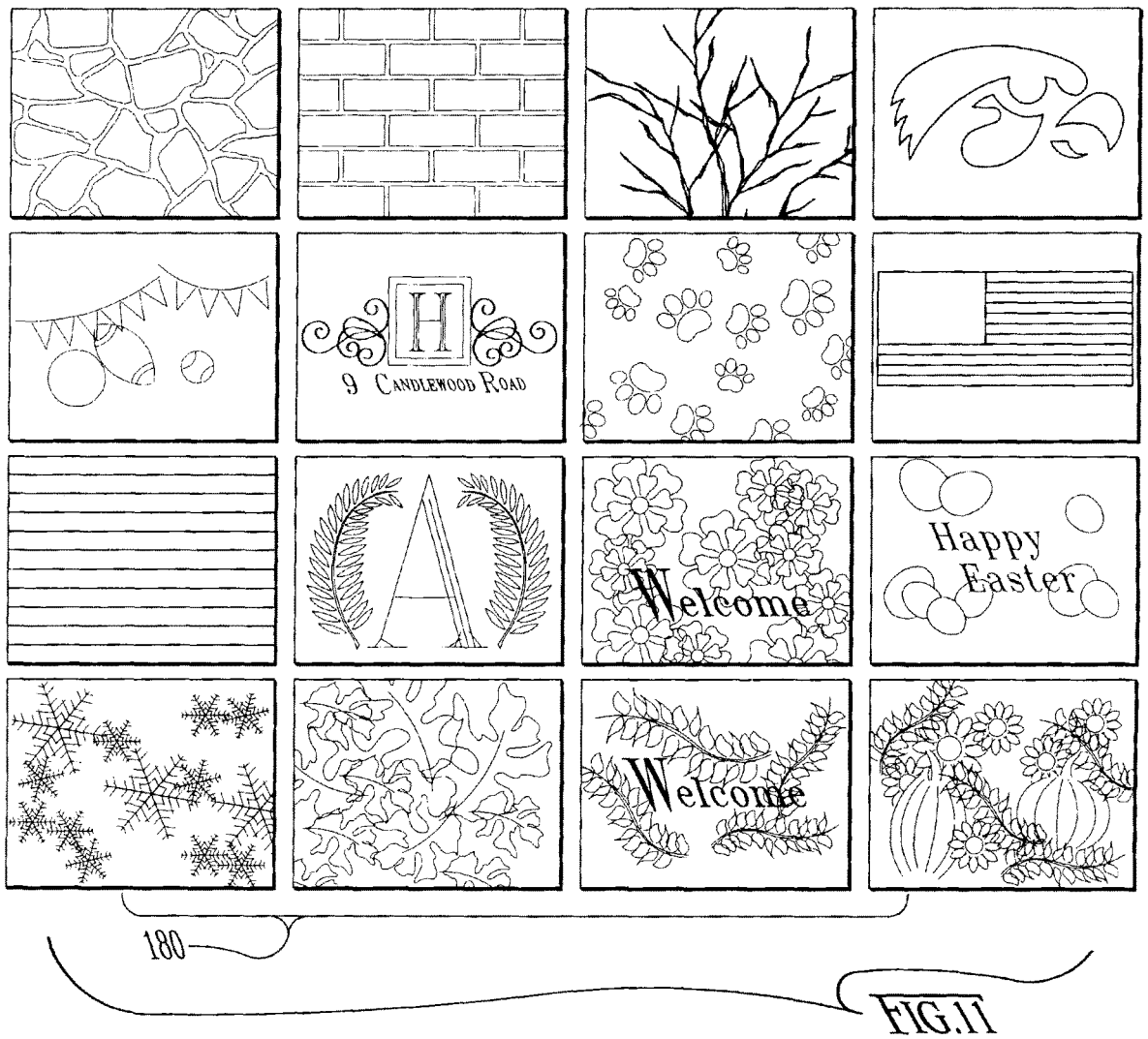
FIG. 11 illustrates a variety of wraps that may be placed around the base of a sectional planter in accordance with one embodiment of the invention.

As shown in FIG. 11, the base 120 of sectional planter 100 may optionally be wrapped in a decorative wrap 180 such as the ones depicted or any other design. Use of such a wrap 180 serves decorative purposes, and may be particularly useful if one or more sectional planters 100 are used for events and can be customized to match a particular venue, season, or theme.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sectional planter comprising:
a base comprising a first base section, the first base section comprising a vertical first upstanding wall and a vertical second upstanding wall, and a second base section, the second base section comprising a vertical first upstanding wall and a vertical second upstanding wall, wherein the vertical first upstanding wall of the first base section engages the vertical second upstanding wall of the second base section and the vertical second upstanding wall of the first base section engages the vertical first upstanding wall of the second base section;
a first cross support wherein a first end of the first cross support is connected to the vertical first upstanding wall of the first base section and a second end of the first cross support is connected to the vertical second upstanding wall of the first base section, and a second cross support wherein a first end of the second cross support is connected to the vertical first upstanding wall of the second base section and a second end of the second cross section is connected to the vertical second upstanding wall of the second base section; and a first insert and a second insert, wherein the first insert and second insert each comprise a bottom surface and one or more connected vertical sidewalls such that the first insert and second insert are each configured to hold objects within a volume formed by the bottom surface and one or more connected vertical sidewalls and the first insert and second insert are configured to be removably inserted into the base such that the first insert and second insert each rest on the first cross support and second cross support, and wherein a notch in each of the first insert and second insert allows the sectional planter to be positioned around a generally vertical structure;

wherein the connected vertical sidewalls of the first insert and the second insert each comprise a height, and the first cross support and second cross support are positioned such that a distance between a top surface of the base and a top surface of each of the first cross support and the second cross support equals the height of the first insert and the second insert.

2. The sectional planter of claim 1 wherein the first base section connects to the second base section using a fastener.

3. The sectional planter of claim 2 wherein the fastener comprises a hook and eye.

4. The sectional planter of claim 1 wherein the first insert and second insert may be inverted to form a flat surface on top of the base such that the first insert and second insert rest on the first cross support and second cross support and the bottom surface of each of the first insert and the second insert is generally co-planar with the top surface of the base when the first insert and second insert are inverted.

5. The sectional planter of claim 1 further comprising a decorative wrap configured to surround and cover the base.

6. A sectional planter comprising:

a base comprising a first base section, the first base section comprising at least one vertical upstanding wall, and a second base section, the second base section comprising at least one vertical upstanding wall;

a first cross support wherein a first end of the first cross support is connected to a first point on the at least one vertical upstanding wall of the first base section and a second end of the first cross support is connected to a second point on the at least one vertical upstanding wall of the first base section;

a second cross support wherein a first end of the second cross support is connected to a first point on the at least one vertical upstanding wall of the second base section and a second end of the second cross support is connected to a second point on the at least one vertical upstanding wall of the second base section; and a first insert and a second insert, wherein the first insert and second insert each comprise a bottom surface and one or more connected vertical sidewalls such that the first insert and second insert are each configured to hold objects within a volume formed by the bottom surface and one or more connected vertical sidewalls and the first insert and second insert are configured to be removably inserted into the base such that the first insert and second insert each rest on the first cross support and second cross support, wherein a notch in each of the first insert and second insert allows the sectional planter to be positioned around a generally vertical structure;

wherein the connected vertical sidewalls of the first insert and the second insert each comprise a height, and the first cross support and second cross support are positioned such that a distance between a top surface of the base and a top surface of each of the first cross support and the second cross support equals the height of the first insert and the second insert.

7. The sectional planter of claim 6 wherein the first base section connects to the second base section using a fastener.

8. The sectional planter of claim 7 wherein the fastener comprises a hook and eye.

9. The sectional planter of claim 6 wherein the first insert and second insert may be inverted to form a flat surface on top of the base such that the first insert and second insert rest on the first cross support and second cross support and the bottom surface of each of the first insert and the second insert is generally co-planar with the top surface of the base when the first insert and second insert are inverted.

10. The sectional planter of claim 6 further comprising a decorative wrap configured to surround and cover the base.

* * * * *